United States Patent

[11] 3,617,447

[72] Inventors Kei Arima;
 Gakuzo Tamura, both of Bunkyo-ku, Tokyo, Japan
[21] Appl. No. 790,162
[22] Filed Jan. 9, 1969
[45] Patented Nov. 2, 1971
[73] Assignee The United States of America as represented by the Secretary of Agriculture

[54] PRODUCTION OF MEVALONIC ACID BY ENDOMYCOPSIS FIBULIGER
 1 Claim, No Drawings
[52] U.S. Cl. .................................................... 195/37
[51] Int. Cl. ..................................................... C12d 13/00
[50] Field of Search ......................................... 195/37, 31, 32, 30

[56] References Cited
OTHER REFERENCES

Tamura et al., " Production of Mevalonic Acid by Fermentation," Applied Microbiology, July 1968, pp. 965– 972, Vol. 16

Primary Examiner—A. Louis Monacell
Assistant Examiner—Gary M. Nath
Attorneys—R. Hoffman and W. Bier ABSTRACT: Four- to 5-day fermentations of the unrestrictedly available yeast *Endomycopsis fibuliger* NRRL Y–7069 (catalogued by the Institute of Applied Microbiology, Tokyo, as IAM–4347) provides the production of about 1,000 micrograms of mevalonic acid per milliliter of fermented medium.

A nonexclusive, irrevocable, royalty-free license in the invention herein described, throughout the world for all purposes of the United States Government, with the power to grant sublicenses for such purposes, is hereby granted to the Government of the United States of America.

PRODUCTION OF MEVALONIC ACID BY ENDOMYCOPSIS FIBULIGER

BACKGROUND OF THE INVENTION

Mevalonic acid, more readily present in the lactone form, i.e., as the β-methyl δ-valerolactone, was first isolated as a trace constituent of distillers solubles by Wright et al., JACS 78:5273 (1956) and contemporaneously under the name "hiochic acid" in fermentation broths of *Aspergillus oryzae*, *Penicillium*, *Hansenula*, *Pichia*, and *Lactobacillus* by Tamura, J. Gen. Appl. Microbiol. 2:431 (1956). It is known to be an essential growth factor for *Lactobacillus heterohiochii* strain H-1, which organism thus provides a bioassay method.

Mevalonic acid is now well known to be a biological precursor of a large variety of naturally occurring isopropenoids including steroids, carotenoids, terpenes, and fat-soluble vitamins. Very small quantities of mevalonic acid lactone are commercially available from some biological suppliers. However, the unusually high price of mevalonic acid per milligram indicates its origin as being from the large variety of micro-organisms that are known to produce only at most about 100 $\mu$g. of mevalonic acid per milliliter.

One object of the instant invention is to lower the cost of mevalonic acid through use of a newly discovered micro-organism capable of producing greatly increased amounts of that acid.

A more specific object is the provision of a commercially practicable process wherein the aerobic fermentation of the known and unrestrictedly available yeast, *Endomycopsis fibuliger* IAM-4347 (NRRL Y-7069) produces on the order of about at least 1,000 $\mu$g. (gammas) of mevalonic acid or mevalonic acid lactone per milliliter of fermented medium. This object has now been achieved by methodically testing a total of 1,006 distinct species of micro-organisms including 369 fungi belonging to the genera *Aspergillus*, *Penicillium*, *Basidiomycetes*, and *Phycomycetes*; 208 different yeasts belonging to the genera *Endomycopsis*, *Pichia*, *Hansenula*, *Candida*, *Saccharomyces*, and *Schizosaccharomycetes*; 95 different *Actinomycetes*; and 274 different bacteria. In the course of such testing we discovered that under nonoptimized screening conditions the yeast *Endomycopsis fibuliger* IAM-4347 produced 204 $\mu$g. of mevalonic acid per milliliter, and *Endomycopsis capsularis* IAM-4307 produced 178 $\mu$g. per milliliter under the same conditions while of all the fungi, only five species belonging to the genus *Aspergillus*, as well as the species *Mucor fragilis* IAM-6143 and the species *Penicillium verruculosum* IAM-7073 produced as much as 100 $\mu$g. of mevalonic acid per milliliter. The aqueous screening medium in each instance had the following composition in percent by weight:

| | |
|---|---|
| Glucose | 10 |
| Malt extract | 1 |
| Peptone | 0.5 |
| Yeast extract | 0.1 |
| NH$_4$Cl | 0.3 |
| KH$_2$PO$_4$ | 0.2 |
| MgSO$_4$·7H$_2$O | 0.05 |
| CaCO$_3$ | 1.0 |
| Dist'd water qsad. | 100.00 |
| (pH adjusted to 5.0–5.5) | |

Based on the foregoing results, we confined ourselves to an investigation of the fermentation medium and other specific requirements for markedly increasing the production of mevalonic acid by *Endomycopsis fibuliger*, which refinements, fully set forth in the specific embodiment, provide substantially a fivefold enhancement of production to the level of about 1,000 $\mu$g. per milliliter, as shown by turbidometric assays or, preferably, paper disc growth response assays of the organism *Lactobacillus heterohiochii* strain H-1 (IAM) for which mevalonic acid is a required growth factor.

EXAMPLE 1

Sakaguchi flasks each containing 100 ml. of a semisynthetic medium having the following percentage composition by weight:

| | |
|---|---|
| Glucose | 10 |
| Peptone | 0.5 |
| Yeast extract | 0.1 |
| KH$_2$PO$_4$ | 0.5 |
| NH$_4$Cl | 0.3 |
| MgSO$_4$·7H$_2$O | 0.05 |
| Calcium pantothenate | 0.1 |
| CaCO$_3$ | 1.0 |
| Dist'd water qsad. | 100.0 |
| (pH 5.0–6.0) | | were inoculated by loop transfer with a malt agar slant subculture of *Endomycopsis fibuliger* NRRL Y-7069, and the inoculated flasks were incubated at 30° C. (distinctly reduced production at 26.5° or 37°) for 4 days on a shaker reciprocating at the rate of 240 r.p.m. The addition of KCN at the 0.01 M level on the fourth day followed by another 24 hours of fermentation slightly improved the production of mevalonic acid, apparently by inhibiting the loss of acetyl Co–A.

The fermented media were filtered, and the filtrates were concentrated in vacuo. The pH of the concentrates was adjusted to 2.0 with dilute sulfuric acid, and the concentrates were then extracted three times with equal volumes of butanol. The pooled butanol extracts were vacuum distilled to partially remove solvent, and the raffinate was then extracted with dilute NaOH solution. The pH of the alkaline extract was adjusted to 2.0 with dilute H$_2$SO$_4$, the acidified extract decolorized with active charcoal, and the decolorized material was then extracted under vacuum with ethyl acetate. The ethyl acetate extract was dried with Na$_2$SO$_4$ anhydride, distilled to remove the remaining solvent, and the distillant filtered, leaving an oillike brownish material which was then dissolved in a small amount of chloroform, and the solution then purified by fractional elution with chloroform-butanol (2–5 percent butanol) from a chromatographic column consisting of 100 g. silicic acid, 60 ml. distilled water, and 4 volumes of chloroform. The eluates were rechromatographed, then neutralized with N/20 NaOH, and then the obtained mevalonyl lactone was converted to the quinene salt which precipitated from benzene-chloroform as needle-shaped crystals melting at 137°–138° C. The highly purified lactone that was freed from the crystallized quinene salt exhibited an infrared spectrum identical to that of an authentic sample of mevalonyl lactone. *Lactobacillus heterohiochii* bioassay of the neutralized eluate, above, showed that slightly less than 1,000 $\mu$g. of mevalonic acid were present per milliliter of the fermented medium.

We claim:

1. A microbiological process for producing mevalonic acid comprising inoculating an aqueous medium containing 10 percent glucose, 0.5 percent peptone, 0.1 percent yeast extract, 0.5 percent KH$_2$PO$_4$, 0.3 percent NH$_4$Cl, 0.05 percent MgSO$_4$·7H$_2$O, 0.1 percent Ca pantothenate, and 1.0 percent CaCO$_3$ with a malt-agar subculture of *Endomycopsis fibuliger* NRRL Y-7069, fermenting the inoculated medium at 30° C. for 4 to 5 days while shaking to produce mevalonic acid, and isolating the thusly produced mevalonic acid therefrom.

* * * * *